(12) United States Patent
Wu et al.

(10) Patent No.: US 10,832,054 B2
(45) Date of Patent: Nov. 10, 2020

(54) GUIDANCE SEEKING DEVICE FOR A SATELLITE AND METHOD FOR ENHANCING THE PERFORMANCE OF THE SAME

(71) Applicant: National Applied Research Laboratories, Taipei (TW)

(72) Inventors: Pei Hsuan Wu, Taipei (TW); Jer Ling, Taipei (TW); Po-Yen Huang, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 116 days.

(21) Appl. No.: 16/160,643

(22) Filed: Oct. 15, 2018

(65) Prior Publication Data

US 2020/0117880 A1  Apr. 16, 2020

(51) Int. Cl.
*G06K 9/00* (2006.01)
*G05D 1/00* (2006.01)
(Continued)

(52) U.S. Cl.
CPC ......... *G06K 9/0063* (2013.01); *G05D 1/0094* (2013.01); *G06K 9/4604* (2013.01); *G06N 20/00* (2019.01)

(58) Field of Classification Search
CPC ............... G06K 9/0063; G06K 9/4604; G06K 9/00369; G06K 9/00791; G06K 9/00805; G06K 9/2054; G06K 9/3233; G06K 9/626; G06K 2209/21; G06K 9/629; G06T 2207/10032; G06T 2207/30212; G06T 2207/30252; G06T 7/70; G06T 7/73; G06N 20/00; B64G 1/68; B64G 1/1021; B64G 3/00; B64G 2001/1028; G05D 1/0094; G05D 1/0038; G05D 1/101; G05D 1/107; G05D 2201/0207; B64C 2201/127; B64C 2201/141; B64C 2201/146; B64C 2201/021; B64C 2201/024; B64C 2201/028; B64C 2203/00; B64C 39/024; B64D 47/08; G01C 11/02; G01C 21/20;
(Continued)

(56) References Cited

U.S. PATENT DOCUMENTS 9,983,585 B1\* 5/2018 Ross ................... B64G 1/1021
2010/0232638 A1\* 9/2010 Leprince ................ G01C 11/02
382/100
(Continued)

*Primary Examiner* — Jose L Couso
(74) *Attorney, Agent, or Firm* — Muncy, Geissler, Olds & Lowe, P.C.

(57) ABSTRACT

A guidance seeking device for a satellite and a method of enhancing the performance of the same. The device includes a seeking device, at least one image-capturing device and a processing device. The seeking device and the at least one image-capturing device are for capturing an image to produce an image data. The processing device is configured to analyze the image data to determine a target and/or an obstacle therein, to produce an image-capturing path according to the target and/or the obstacle in the image data, and to produce a control signal to control the at least one image-capturing device to capture an image corresponding to one part of the image-capturing path. The method includes a seeking step, an analyzing step, a determination step and a controlling step.

18 Claims, 7 Drawing Sheets

(51) Int. Cl.
*G06K 9/46* (2006.01)
*G06N 20/00* (2019.01)

(58) Field of Classification Search
CPC ............ G01C 21/3602; G08G 5/0034; G08G 5/0069; G08G 5/0086; H04N 5/23203; H04N 5/23296; H04N 5/23216; H04N 7/183; H04N 7/185; F41G 7/008; F41G 7/007; F41G 7/2226; F41G 7/2253; F41G 7/2293; G03B 15/006
See application file for complete search history.

(56) References Cited

U.S. PATENT DOCUMENTS

| | | | |
|---|---|---|---|
| 2012/0188372 A1* | 7/2012 | Ozkul | B64G 1/1021 348/144 |
| 2015/0302567 A1* | 10/2015 | Patterson | G06T 5/50 382/191 |
| 2016/0306824 A1* | 10/2016 | Lopez | G06T 3/4092 |
| 2016/0363451 A1* | 12/2016 | Zhang | B64G 1/36 |
| 2017/0073088 A1* | 3/2017 | Jeon | B64G 1/244 |
| 2018/0053038 A1* | 2/2018 | Robinson | G06T 7/70 |
| 2018/0239982 A1* | 8/2018 | Rutschman | G06K 9/209 |
| 2019/0033891 A1* | 1/2019 | Giraud | B64G 1/641 |
| 2020/0005097 A1* | 1/2020 | Sinclair | G01S 13/867 |

* cited by examiner

GUIDANCE SEEKING DEVICE FOR A SATELLITE AND METHOD FOR ENHANCING THE PERFORMANCE OF THE SAME

FIELD OF THE INVENTION

The present invention is related to a guidance seeking device and a method for enhancing the performance of a satellite, and more particularly to a device provided with a seeker having a wide-range search function capable of providing an image-capturing angle and an image-capturing path and a method for improving the entire performance of the satellite.

BACKGROUND OF THE INVENTION

Satellite images have high value in the field of commercial events, military and rescue operations, and satellites with high-resolution lens are highly developed today. However, in the case where the type of sensor set at the satellite is specific (that is, the passive optical system or the active radar system), there will be a technical problem that the image capturing range of the satellite is not sufficient. Please refer to FIG. 6, such situation would make it easy for the satellite to capture an image data that includes obstacle, such as clouds or mist, during operation, and it will take a lot of time to screen out the captured image data having clouds during the subsequent processing for the captured image data. It not only wastes time, but also depletes the software and hardware resources of the satellite.

On the other hand, image data captured by the satellite are often used in the fields of ecology, agriculture and urban planning, such as old wood surveys, hillside development, old house identification, vegetation surveys, and Normalized Difference Vegetation Index. However, in the field of rescue operation for marine vessels or ships, for example, during hotspot fishing time, such as in midnight, and under bad weather condition, such rescue operations require extremely accurate prior risk assessments, and thus the analysis for vessels or ship in image data captured by satellite is even more important in the present time. However, no related applications for using satellite to trace specific transportation such as vessels or ships have been developed.

Accordingly, in order to improve above technical problems, the present invention is provided.

SUMMARY OF THE INVENTION

In order to solve above technical problems, the present invention provides a guidance seeking device for an onboard satellite, which has a seeking device with low resolution and a wide angle provided on a seeker and a image-capturing device provided on a main payload. By the way of having the seeking device provided on the seeker capture images before the image-capturing device provided on the main payload captures images, the produced image data is analyzed by the processing device, and an image-capturing path is produced by the processing device, the image-capturing device of the present invention can capture image corresponding to at least one part of the image-capturing path with at least one of the image-capturing angles. As a result, the present invention can use the best image-capturing path and angle to effectively avoid specific obstacles, such as clouds, and to effectively trace specific targets such as ships, cars and other transportation.

In order to fulfill above purpose, the present invention provides a guidance seeking device for a satellite, comprising a seeking device, at least one image-capturing device and a processing device. The seeking device and the at least one image-capturing device for capturing an image to produce an image data. The processing device is configured to analyze the image data to determine an target and/or an obstacle therein, and to produce an image-capturing path according to the target and/or the obstacle in the image data, and to produce a control signal to control the at least one image-capturing device to capture an image corresponding to one part of the image-capturing path.

In implementation, the processing device is further configured to determine a plurality of targets or a plurality of obstacles in the image data and to determine the image-capturing path according to the distribution of the plurality of targets or the plurality of obstacles.

In implementation, the at least one image-capturing device is provided with a plurality of lens, and the at least one image-capturing device captures an image corresponding to the one part of the image-capturing path with at least one of the plurality of lens.

In implementation, the guidance seeking device for a satellite further comprises a labeling device for labeling an additional target or the obstacle in the image data to produce the image-capturing path.

In implementation, the seeking device or the at least one image-capturing device is further provided with a VNIR-SWIR imaging sensor.

In implementation, the processing device is further configured to determine at least one angle at which the image data corresponding to the part of the image-capturing path is captured according to an orbit height of the satellite and a position of the target and/or the obstacle.

In implementation, the processing device is a machine-learning based processing device.

In implementation, the seeking device is provided with a low resolution and wide angle lens; the at least one image-capturing device is provided with a high resolution lens.

In implementation, the processing device is further configured to produce an image-capturing path according to a historical trajectory in a time period of the target and/or the obstacle; and to compare an actual trajectory in progress with the part of the image capturing path and produce a comparison result; and to correct the remaining part of the image capturing path according to the comparison result.

In implementation, the obstacle is a cloud, and/or the target is transportation.

The present invention further provides a method of enhancing the performance of a satellite, comprising a seeking step, an analyzing step, a determination step and a controlling step. The seeking step is of capturing an image with a seeking device to produce an image data; the analyzing step is of analyzing the image data to determine at least one of an target and/or an obstacle by the processing device; the determination step is of producing the image-capturing path according to the target and/or the obstacle by the processing device; and the controlling step is of producing a control signal by the processing device to control at least one image-capturing device to capture an image corresponding to one part of the image-capturing path.

In implementation, the analyzing step further comprises a step of determining a plurality of targets or a plurality of obstacles in the image data, and the determination step further comprises a step of producing the image-capturing path with the processing device according to the distribution of the plurality of targets and/or the plurality of obstacles.

In implementation, the at least one image-capturing device is provide with plurality of lens, and the determination step further comprises a step of capturing an image corresponding to the part of the image-capturing path with at least one of the plurality of lens by the at least one image-capturing device.

In implementation, the method of enhancing the performance of a satellite further comprises a labeling step: labeling an additional target or the obstacle in the image data to produce the image-capturing path.

In implementation, the seeking device or the at least one image-capturing device is further provided with a VNIR-SWIR imaging sensor.

In implementation, the method of enhancing the performance of a satellite further comprises an angle-determining step of determining the at least one angle at which the image data corresponding to at least one part of the image-capturing path is captured according to the orbit height of the satellite and the position of the target or the obstacle.

In implementation, the processing device is a machine-learning based processing device.

In implementation, the seeking device is provided a low resolution and wide angle lens; the at least one image-capturing device is provided a high resolution lens.

In implementation, the determination step further comprises: producing, by the processing device, an image-capturing path according to a historical trajectory in a time period of the target and/or the obstacle; and the method further comprising a correcting step after the controlling step: comparing an actual trajectory in progress with the part of the image capturing path and producing a comparison result; and correcting the remaining part of the image capturing path according to the comparison result.

In implementation, the obstacle is a cloud, and/or the target is transportation.

The present invention will be understood more fully by reference to the detailed description of the drawings and the preferred embodiments below.

DETAILED DESCRIPTIONS OF PREFERRED EMBODIMENTS

Figure 1:
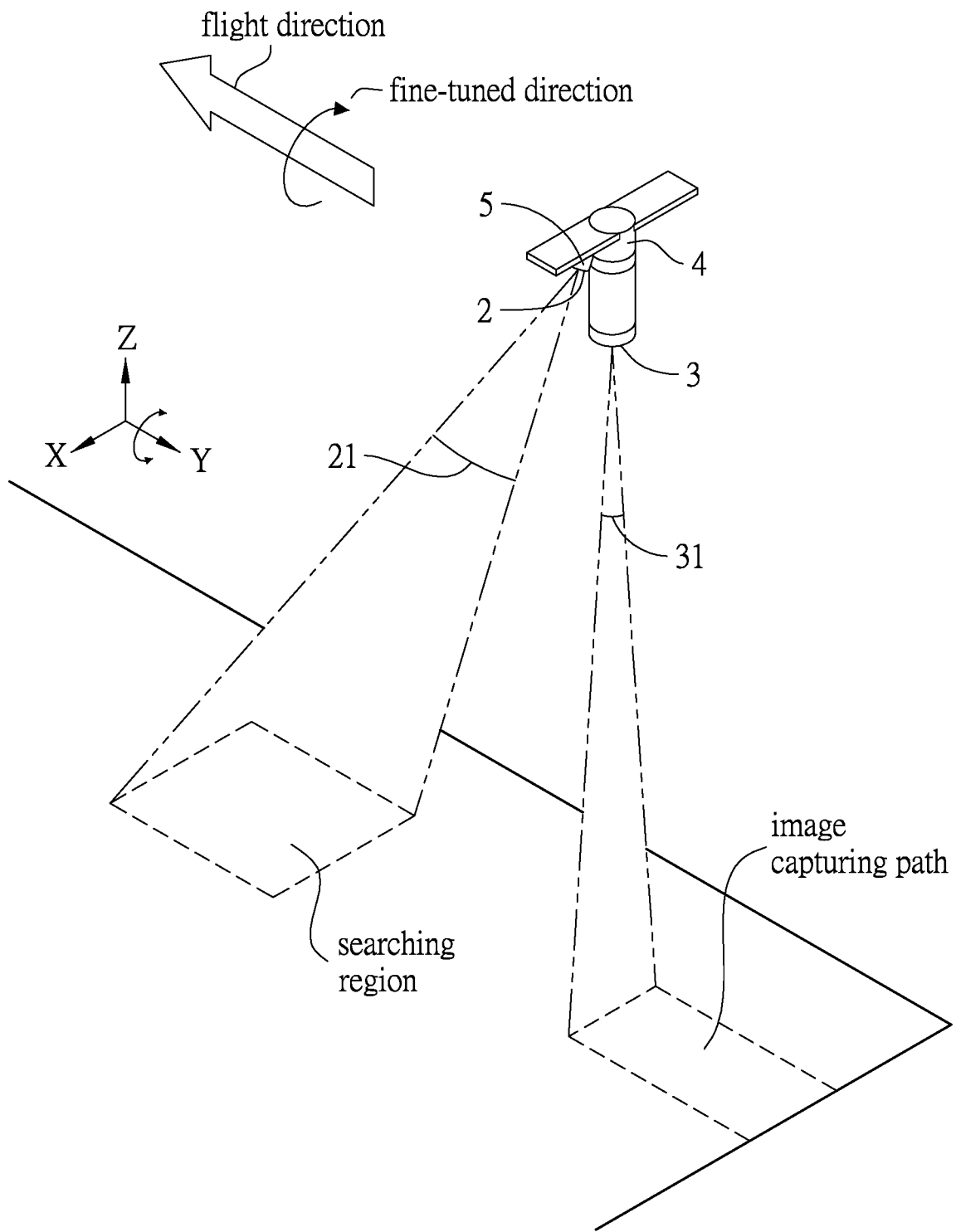
FIG. 1 is a schematic view showing a specific embodiment using the guidance seeking device for the satellite and the method for enhancing the performance of the same of the present invention.

Referring to FIG. 1, a main payload 4 of the guidance seeking device for a satellite of the present invention is provided with an image-capturing device 3 for providing high-resolution images, and a seeker 5 is provided with a seeking device 2 for providing a low-resolution and wide-angle image. In another embodiment, the seeking device 2 can also be provided with a high resolution lens, and image-capturing device 3 can also be provided with wide-angle lens. The device of the present invention can capture images on the surface of the earth daily. In order to shorten the image capturing period and to have the image capturing range to capture images from the whole earth, in one embodiment, the device of the present invention has a sun-synchronous orbit with an orbit height of 720 km and an angle of inclination of 98.27°. The orbit has a feature of two-days repeating image-capturing path and the main payload 4 can be adjusted with a satellite rotation angle of 45 degrees (that is, the image-capturing angle) to capture images from main surface area on the earth. The device of the present invention is equipped with a propulsion system for initial rail adjustment and subsequent rail maintenance.

Figure 4:
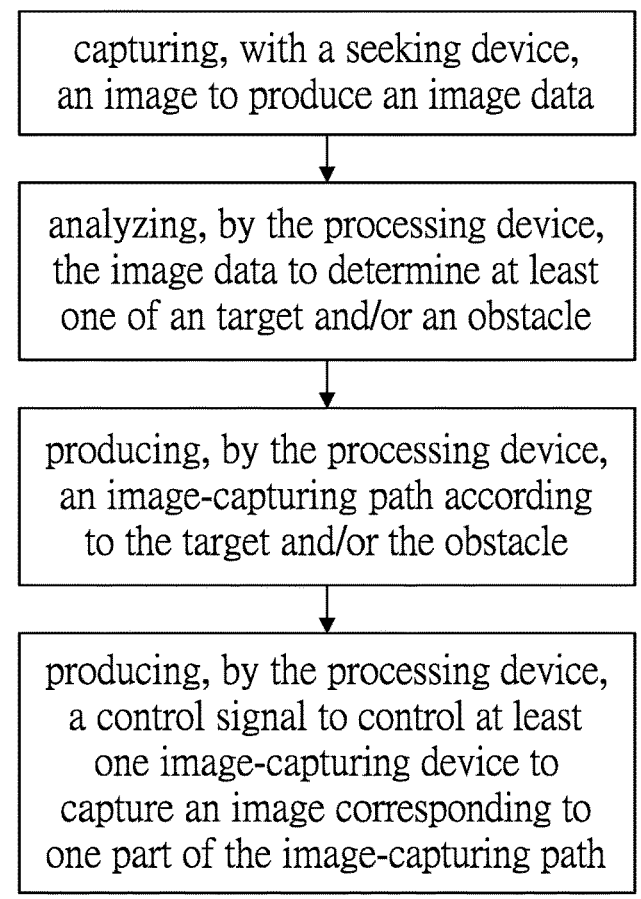
FIG. 4 is a schematic view showing the method for enhancing the performance of the guidance seeking device for a satellite of the present invention.

Please refer to FIG. 4, the method of the present invention comprises following steps:

a seeking step: capturing, with a seeking device, an image to produce an image data;

an analyzing step: analyzing, by the processing device, the image data to determine at least one of an target and/or an obstacle;

a determination step: producing, by the processing device, an image-capturing path according to the target and/or the obstacle;

a controlling step: producing, by the processing device, a control signal to control at least one image-capturing device to capture an image corresponding to one part of the image-capturing path.

Figure 2:
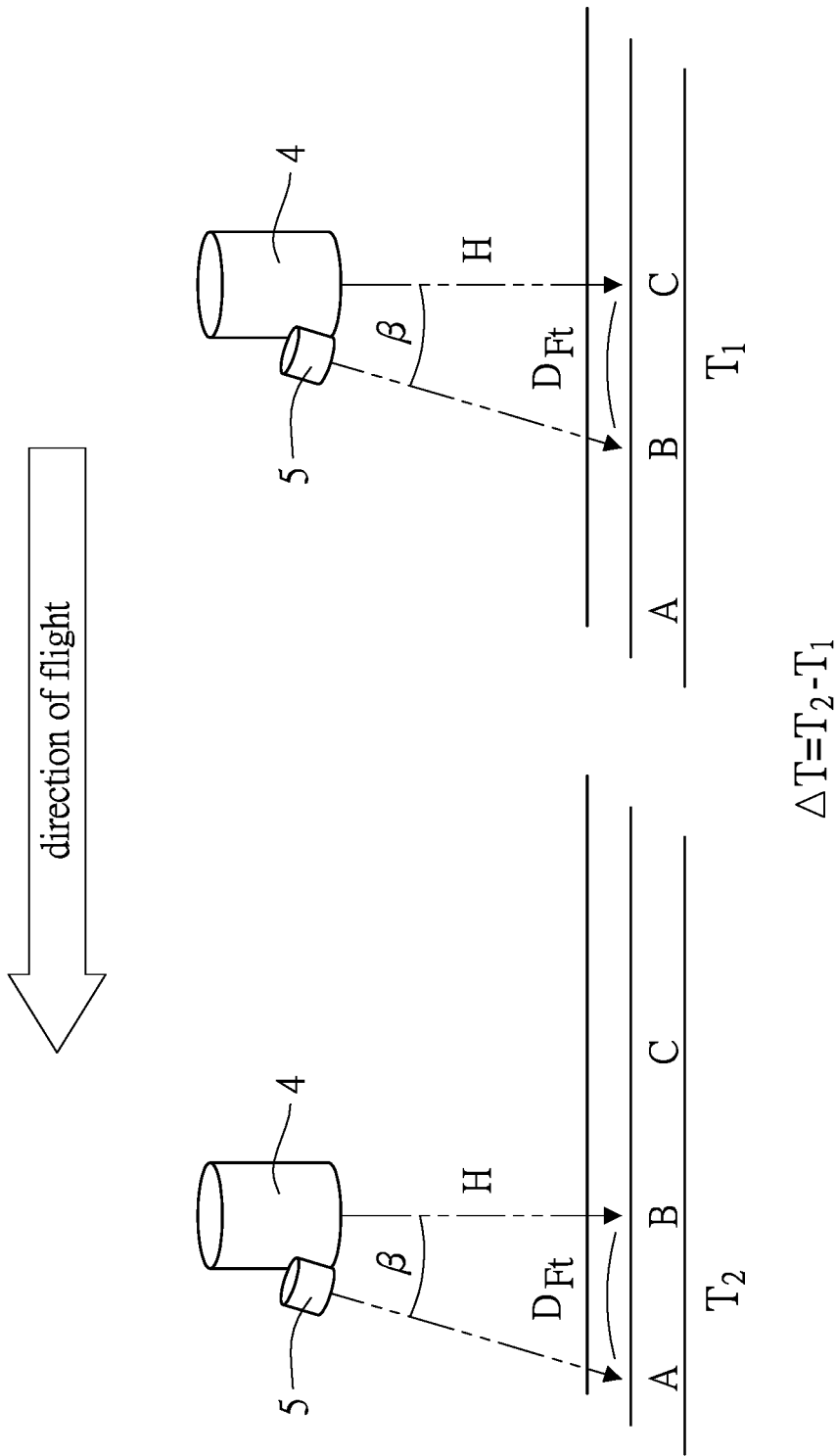
FIG. 2 is a schematic view showing a specific embodiment using the guidance seeking device for the satellite and the method for enhancing the performance of the same of the present invention.

The device and method of the present invention are described in details below. Referring to FIG. 1, firstly, in the seeking step, an image is captured with a seeking device to produce an image data. The seeking device 2 of the present invention captures images with a first image-capturing angle 21 to produce the image data, and the seeking device 2 captures images before the image-capturing device 3 in few minutes. Referring to FIG. 2, the seeking device 2 first captures an image from a searching region in $T_1$ time interval, and then the image-capturing device 3 captures an image in $T_2$ interval (that is, the image-capturing device 3 will capture the images in the pre-view searching region of the seeking device 2 after $\Delta T$ described as $T_2$-$T_1$).

Figure 3:
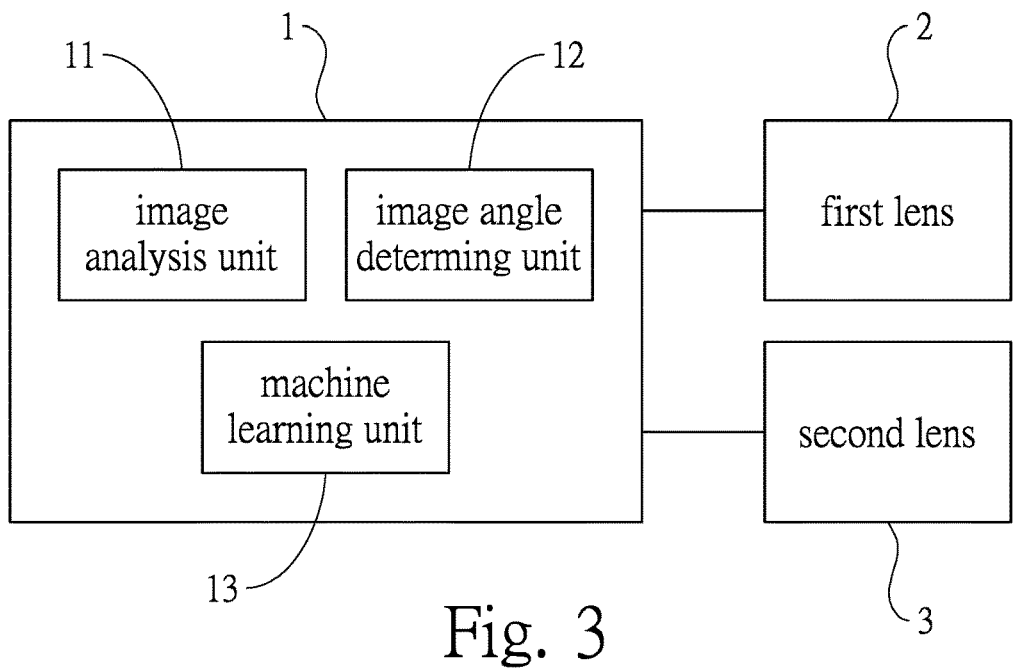
FIG. 3 is a schematic view showing the structure of a specific embodiment of the guidance seeking device for a satellite of the present invention.

Referring to FIG. 3, the main payload 4 is provided with a processing device 1, which is provided with an image analyzing unit 11, an image-capturing angle determining unit 12 and a machine learning unit 13. The processing device 1 is configured to analyze the image data to determine a target and/or an obstacle, and to produce an image-capturing path according to the target and/or the obstacle, and to produce a control signal to control the at least one image-capturing device 3 to capture an image corresponding to one part of the image-capturing path. In the analyzing step, the image data is analyzed by the processing device to determine a target and/or an obstacle. The analyzing step further comprises: marking the target or the obstacle therein to producing the image-capturing path. The image analyzing unit 11 is for analyzing the image data and recognizing layer distribution of the image data and marking the target or the obstacle in the image data according to the feature of objects in the image data. Thereafter, in the determination step, an image-capturing path is produced by the processing device according to the target and/or the obstacle. The image analyzing unit 11 produces the image-capturing path according to various predicting algorithms. The image-capturing path is a better image-capturing path selected from a least one of plurality of possible image-capturing paths, so as to maximize the efficiency of the main payload 4 and save resources of the main payload 4. The analyzing step further comprises: determining at least one angle at which the image data corresponding to part of the image-capturing path is captured according to the orbit height of the satellite and the position of the target or the obstacle. The imaging angle determining unit 12 of the processing device 1 determines at least one image-capturing angle 31 at which the image data corresponding to part of the image-capturing path is captured according to the orbit height of the satellite of the present invention and the position of the target or the obstacle. Please refer to the following descriptions and FIG. 2:

$H$: Orbit Height $\beta$: Fine-turn rotation angle $D_{Ft}$: Fine-turn range $D_{Ft} = H \tan \beta$ $H = 460$ km $\beta$: 0.5°

$D_{Ft} = H \tan \beta$
$= 460 \tan 0.5°$
$= 4$ (km)

$H = 561$ km $\beta$: 0.5°

$D_{Ft} = H \tan \beta$
$= 561 \tan 0.5°$
$= 4.89$ (km)

$H = 720$ km $\beta$: 0.5°

$D_{Ft} = H \tan \beta$
$= 720 \tan 0.5°$
$= 6.28$ (km)

The image analyzing unit 11 and/or the image-capturing angle determining unit 12 calculate the remaining corresponding values based on the values of at least two of the orbit heights, the fine-tune rotation angle, and the fine-tune range. For example, if the height of the orbit is 460 km and the distance between the main payload 4 and the obstacle or object is 4 km, then the fine-tune rotation angle is determined to be 0.5°, and in other examples, the fine-tune rotation angle for the height of the orbit is 561 km or 720 km that is also calculated in the same way. Moreover, the machine learning unit 13 is configured to allow the image analyzing unit 11 to learn to identify the target or the obstacle in the image data. In a machine-learning step, the processing device is assisted to learn to identify the target or the obstacle. The present invention provides a big data database of satellite image data regarding data of the targets or the obstacles to be identified to the machine learning unit 13, so that the machine learning unit 13 would assist the image analyzing unit 11 to recognize various targets and obstacles to be identified in the way of machine learning. In other words, in one embodiment, the processing device 1 is a machine-learning based processing device. The algorithms used by the mechanical learning unit 13 of the present invention can be any algorithms in the field of machine learning, including: decision tree learning, association rule learning, artificial neural networks, deep learning, Inductive logic programming, support vector machines, Bayesian network . . . etc. In another embodiment, the present invention further comprises a labeling step: labeling an additional target or the obstacle in the image data by a labeling device to produce the image-capturing path. In addition to the analyzing unit 11, the present invention can use the labeling device to label an additional target or the obstacle in the image data in order to check the steps of analyzing the image data, recognizing layer distribution of the image data and marking the target or the obstacle in the image data performed by the analyzing unit 11. In another embodiment, the labeling device can be provided with a touch panel or touch screen for an administrator or a user to check and correct the above steps in the way of labeling the additional target or the obstacle in the image data, so as to improve the overall performance of the present invention.

As described above, the image analyzing unit 11 of the processing device 1 generates an image-capturing path according to the position of the target or the obstacle in the image data, so that the image-capturing device 3 captures images according to the suitable image-capturing path. The image-capturing path is generated by the image analyzing unit 11 through above calculation and evaluation. In the controlling step, a control signal is produced by the processing device to control the at least one image-capturing device to capture an image corresponding to one part of the image-capturing path at least one second image-capturing angle 31.

Figure 5:
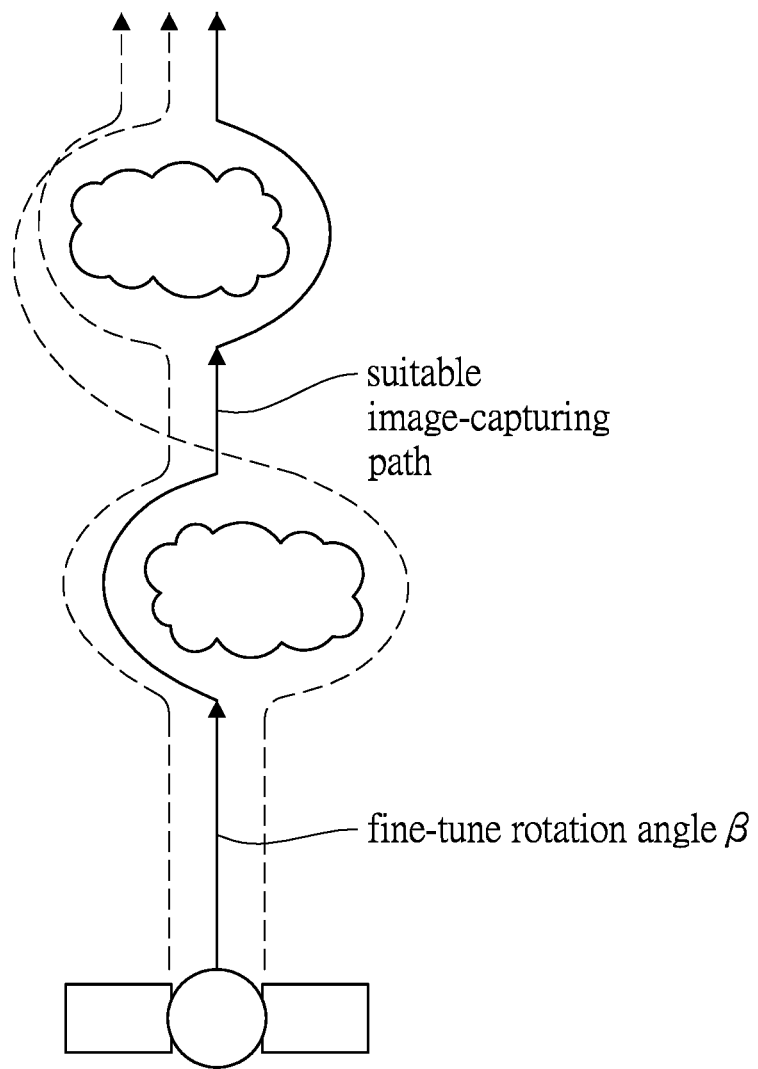
FIG. 5 is a schematic view showing the image capturing path of a specific embodiment of the present invention.
Figure 6:
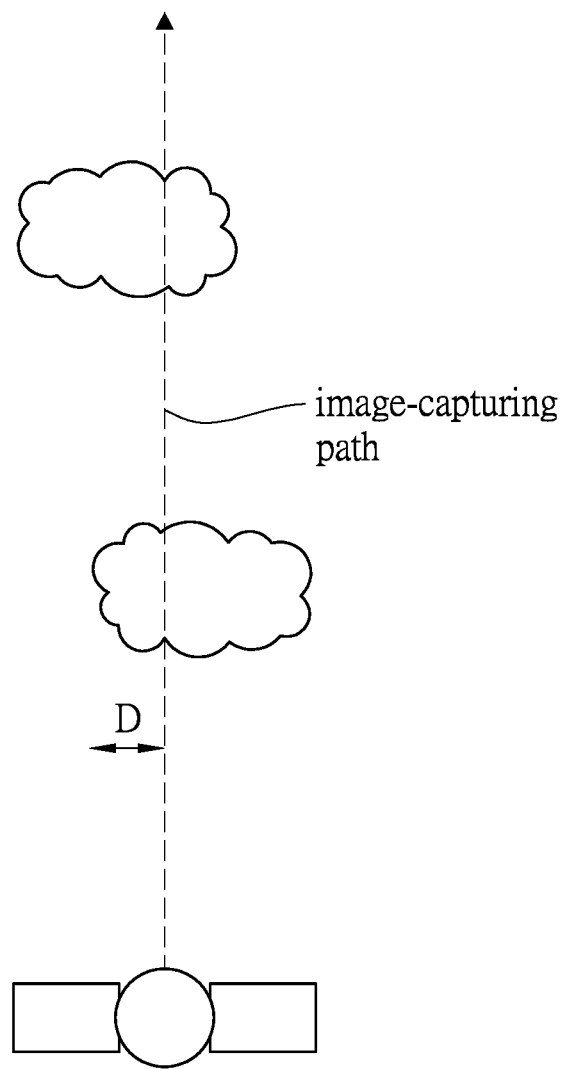
FIG. 6 is a schematic view showing image-capturing paths for a satellite of prior art.

Referring to FIG. 5, it is an example of cloud as an obstacle. If the processing device 1 finds or detects clouds in the image data, the processing device 1 causes the image-capturing device 3 to capture images with at least one second image-capturing angle 31 corresponding to one part of the image-capturing path. It should be noted that, as shown in FIG. 5, the image-capturing device 3 captures an image at least one of the plurality of second image-capturing angles 31 corresponding to one part of the image-capturing path determined according to the current cloud distribution condition (the solid line shown in FIG. 5), so that all the clouds would be effectively avoided, and the image data captured by the image-capturing device 3 does not contain the obstacles (cloud). In another embodiment, under the condition that there are plurality of the targets or the obstacles, the analyzing step further comprises: determining a plurality of targets or a plurality of obstacles in the image data; the processing device 1 is further configured to determine a plurality of targets or a plurality of obstacles in the image data and to determine the image-capturing path according to the distribution of the plurality of targets or the plurality of obstacles. In another embodiment, the image analyzing unit 11 of the processing device 1 is configured to detect a plurality of targets or a plurality of obstacles in the image data and to determine the image-capturing path according to the overall distribution of the plurality of objects or the plurality of obstacles. In other words, the determination step further comprises: producing the image-capturing path with the processing device according to the distribution of the plurality of targets and/or the plurality of obstacles. Referring to FIG. 5, the image analyzing unit 11 selects at least one of the image-capturing path (the solid line) from a plurality of possible or potential image-capturing paths (the dotted lines) according to the overall distribution of the plurality of clouds. In another embodiment, the obstacle of the present invention can be other kind of obstacle. In an assisting step, the seeking device or the image-capturing device is assisted to perform image-capturing with a VNIR-SWIR imaging sensor. The seeking device 2 or the image-capturing device 3 is further provided with a VNIR-SWIR imaging sensor (not shown), so that the recognizing ability of the image analyzing unit 11 for recognizing the target or obstacle in the image data is increased when the seeking device 2 or the image-capturing device 3 captures images in the way of detecting short-wave infrared rays, while the overall performance of recognizing the targets or the obstacles of the machine learning unit 13 is also increased.

In an embodiment, referring to FIG. 1, the processing device of the present invention fine-tunes the second image-capturing angle 31 of the image-capturing device 3 in the way of rotating, so as to capture images from the ground with at least one second image-capturing angle 31 corresponding to one part of the image-capturing path. In another embodiment, the image-capturing device is provided with a plurality of lens. In the controlling step further comprises: capturing an image corresponding to the part of the image-capturing path with at least one of the plurality of lens of the image-capturing device 3 respectively. The processing device 1 determines the image-capturing path according to the image data, and causes the plurality of or at least one of the pluralities of lens of the image-capturing device 3 to capture an image at least one image-capturing angle corresponding to one part of the image-capturing path respectively. In other words, the present invention can capture images by the plurality of or at least one of the plurality of lens of the image-capturing device 3, thereby increasing the overall capturing range of the image-capturing device 3 under the same image-capturing paths, so as to improve the overall operating efficiency of the main payload 3 of the present invention.

Figure 7B:
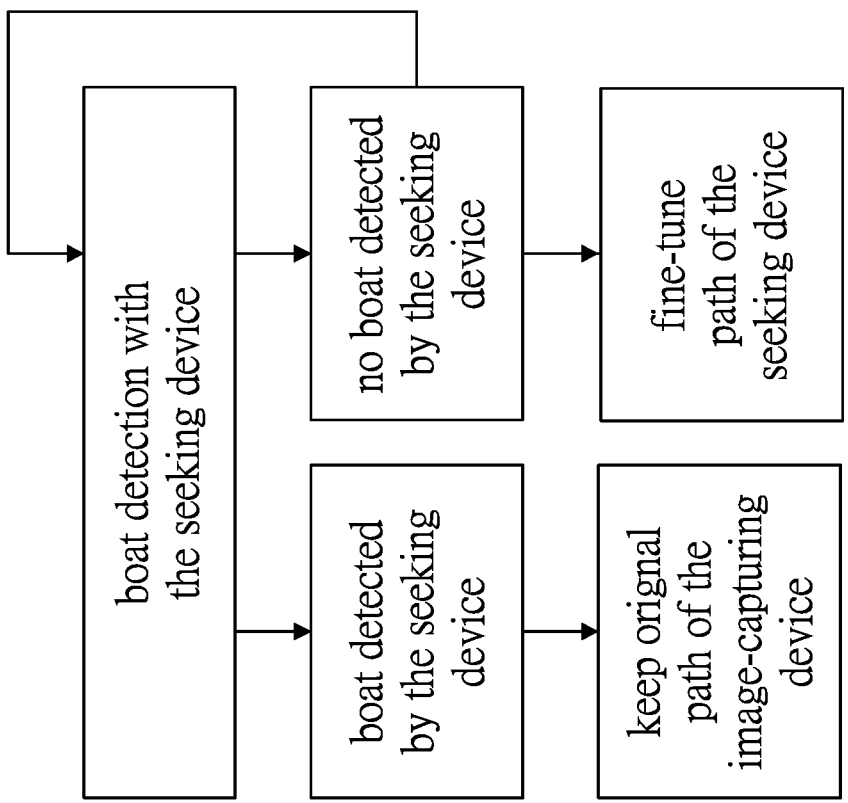
FIG. 7A and FIG. 7B are schematic views showing the steps of specific embodiments using the guidance seeking device for a satellite and the method for enhancing the performance of the same of the present invention.
Figure 7A:
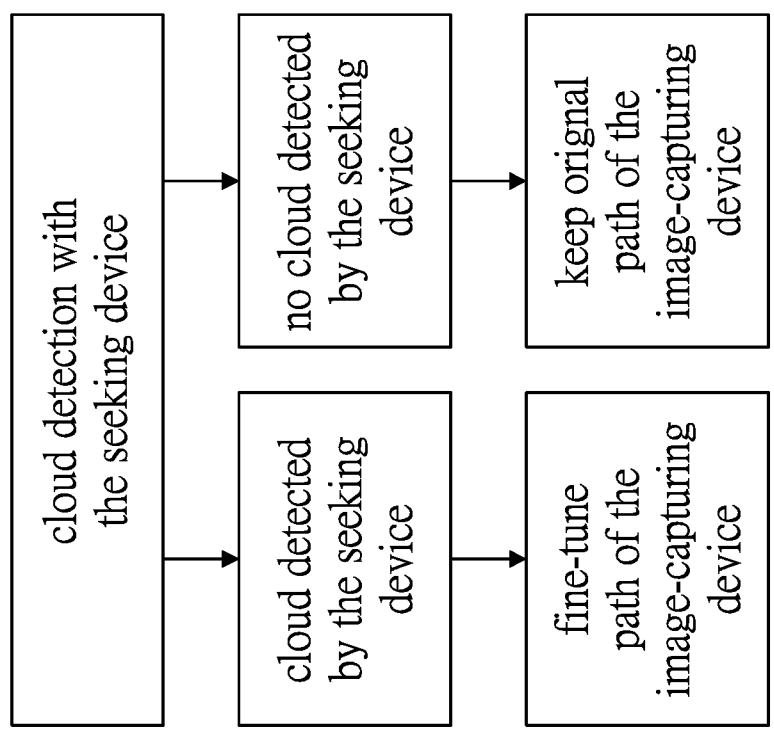

Referring to FIG. 7A, when the obstacles of the present invention are clouds, the image analyzing unit 11 first detects whether a plurality of clouds are in the image data captured by the seeking device 2 or not. If the image analyzing unit 11 detects the clouds, the image analyzing unit 11 determines at least one image-capturing path according to the overall distribution of the plurality of clouds, so that the processing device 1 fine-tunes the image-capturing device 3 to capture images at least one second image-capturing angle 31 corresponding to one part of the image-capturing path. If the image analyzing unit 11 does not detect the cloud, the processing device 1 causes the image-capturing device 3 to maintain the original image-capturing path and the original image-capturing angle. Referring to FIG. 7B, when the target of the present invention is a ship or other transportation such as an airplane or a car, the image analyzing unit 11 first detects whether a ship is in the image data captured by the seeking device 2. When the ship is detected, the processing device causes the image-capturing device 3 to maintain the original image-capturing path and the original image-capturing angle to capture images. If the image analyzing unit 11 does not detect any ship, the processing device 1 causes the seeking device 2 to maintain the original image-capturing path to continue searching or to fine-tune the image-capturing path and the image-capturing angle of the seeking device 2 for further ship searching.

Figure 8:
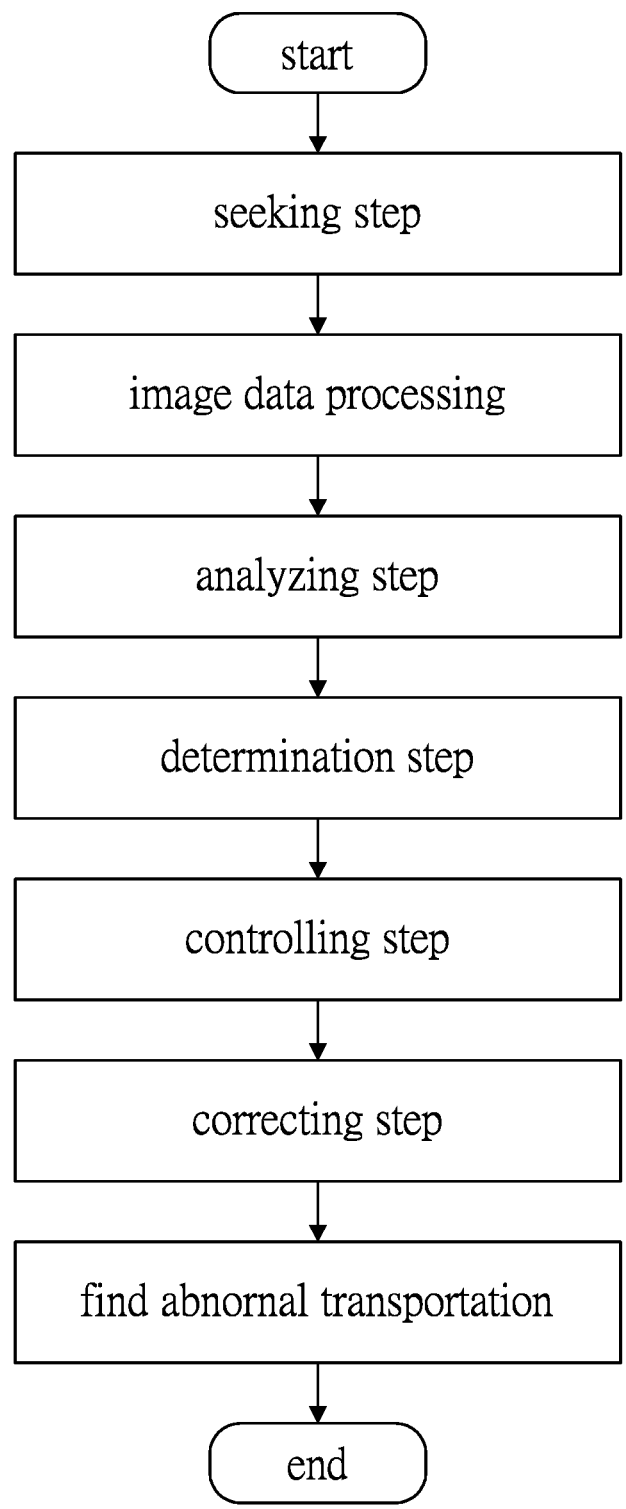
FIG. 8 is a flow chart showing steps of enhancing the performance of a guidance seeking device for a satellite.

Referring to FIG. 8, the present invention further comprises a step of image data processing between the seeking step and the analyzing step. The step of image data processing is to improve the resolution of the image data and the recognition rate of the image data with algorithms, so that the effect of the subsequent steps, for example, the analyzing step can be greatly improved by analyzing the image data with higher resolution. Moreover, referring to FIG. 8, the determination step further comprises: producing, by the processing device 1, an image-capturing path according to a historical trajectory in a time period of the target and/or the obstacle. The historical trajectory is from another database recording all of the trajectories of specific transportations, such as, a specific boat or ship together with automatic identification system (AIS) respectively. In other words, the processing device 1 of the present invention produces the image-capturing path according to the historical trajectory of the specific transportation in a specific time period, so that the produced image-capturing path may be more accurate corresponding to different transportations.

And the method of the present invention further comprises a correcting step after the controlling step: comparing an actual trajectory in progress of transportation with the part of the image capturing path and producing a comparison result. The processing device 1 is programmed as function to compare an actual trajectory in progress (for example, ⅓ of the total course of a specific transportation) with the part of the image capturing path produced according to the historical trajectory in the time period of the target and/or the obstacle. The comparison result represents the difference between the actual trajectory in progress of the specific transportation and the part of the image capturing path. If the difference between the actual trajectory in progress and the part of the image capturing path is beyond at least one of the ranges of the predetermined values, the transportation would be considered to be abnormal and such abnormal transportation will be monitored by relevant institution to prevent any accidents. And if the difference between the actual trajectory in progress and the part of the image capturing path is included in at least one of the ranges of the predetermined values, the processing device 1 would correct the remaining part (for example, ⅔ of the total course of the image capturing path) so as to perform optimal technical effect of the present invention. In other words, the image capturing path of the present invention can be adjusted in time according to the actual trajectory in progress of the target, and can send a warning signal for the abnormal transportation or modify the image capturing path in time. In other embodiments, the machine learning unit 13 is further configured to allow the image analyzing unit 11 to learn to trace the target or the obstacle in the image data. Moreover, in another machine-learning step is of assisting the processing device 1 to learn to trace the target or the obstacle. The machine learning unit 13 is used to assist the image analyzing unit 11 to trace various targets and obstacles in the way of machine learning.

Therefore, the present invention has the following advantages:

1. The image-capturing device of the present invention can capture image corresponding to one part of the image-capturing path (or optimal one) at an image-capturing angle (or optimal one) by a seeking device with low resolution and a wide angle provided at a seeker and a image-capturing device with high resolution provided on a main payload, and having the seeking device provided on the seeker capture images before the image-capturing device provided on the main payload does, and analyzing the generated image data by the processing device As a result, the present invention can use the best image-capturing path at the best angle to effectively avoid specific obstacles, such as cloud, and/or to effectively find specific targets such as ships, cars and other transportation.

2. The image analyzing unit of the present invention is assisted to learn various targets or obstacles recognized in the big data database of the satellite photo by the mechanical learning unit of the processing device of the present invention, so that the image analyzing unit of the present invention has the best performance.

3. The device and the method of the present invention can be effectively applied to the field of the emergency rescue, such as ship rescue, and can quickly find a ship that is lost or in distress with at least one part of the image capturing path and at the image-capturing angle.

The description referred to in the drawings and stated above is only for the preferred embodiments of the present invention. Many equivalent variations and modifications can still be made by those skilled at the field related with the present invention and do not depart from the spirit of the present invention, so they should be regarded to fall into the scope defined by the appended claims.

To sum up, the guidance seeking device for a satellite and the method for enhancing the performance of the same of the present invention can indeed meet its anticipated object and can be applied to the currently available relative device or method, which is highly applicable to all kinds of industry, especially in field of space science.

What is claimed is:

1. A guidance seeking device for a satellite, comprising a seeking device and at least one image-capturing device for capturing an image to produce an image data; and
   a processing device configured to analyze the image data to determine an target and/or an obstacle therein; to produce an image-capturing path according to the target and/or the obstacle in the image data, and to produce a control signal to control the at least one image-capturing device to capture an image corresponding to one part of the image-capturing path, and to produce an image-capturing path according to a historical trajectory in a time period of the target and/or the obstacle, to compare an actual trajectory in progress with the part of the image capturing path and produce a comparison result, and to correct the remaining part of the image capturing path according to the comparison result.

2. The device according to claim 1, wherein the processing device is further configured to determine a plurality of targets or a plurality of obstacles in the image data and to determine the image-capturing path according to the distribution of the plurality of targets or the plurality of obstacles.

3. The device according to claim 1, wherein the at least one image-capturing device is provided with plurality of lens, and the at least one image-capturing device captures an image corresponding to the one part of the image-capturing path with at least one of the plurality of lens.

4. The device according to claim 1, further comprising a labeling device for labeling an additional target or the obstacle in the image data to produce the image-capturing path.

5. The device according to claim 1, wherein the seeking device or the at least one image-capturing device is further provided with a VNIR-SWIR imaging sensor.

6. The device according to claim 1, wherein the processing device is further configured to determine at least one angle at which the image data corresponding to the part of the image-capturing path is captured according to an orbit height of the satellite and a position of the target and/or the obstacle.

7. The device according to claim 1, wherein the processing device is a machine-learning based processing device.

8. The device according to claim 1, wherein the seeking device is provided with a low resolution and wide angle lens; the at least one image-capturing device is provided with a high resolution lens.

9. The device according to claim 1, wherein the obstacle is a cloud, and/or the target is transportation.

10. A method of enhancing the performance of a satellite, comprising:
    a seeking step: capturing, with a seeking device, an image to produce an image data;
    an analyzing step: analyzing, by the processing device, the image data to determine at least one of a target and/or an obstacle;
    a determination step: producing, by the processing device, an image-capturing path according to the target and/or the obstacle; and
    a controlling step: producing, by the processing device, a control signal to control at least one image-capturing device to capture an image corresponding to one part of the image-capturing path;
    wherein the determination step further comprises: producing, by the processing device, an image-capturing path according to a historical trajectory in a time period of the target and/or the obstacle; and the method further comprising a correcting step after the controlling step: comparing an actual trajectory in progress with the part of the image capturing path and producing a comparison result; and correcting the remaining part of the image capturing path according to the comparison result.

11. The method according to claim 10, wherein the analyzing step further comprises: determining a plurality of targets or a plurality of obstacles in the image data, and the determination step further comprises: producing the image-capturing path with the processing device according to the distribution of the plurality of targets and/or the plurality of obstacles.

12. The method according to claim 10, wherein the at least one image-capturing device is provide with plurality of lens, and the determination step further comprises: capturing an image corresponding to the part of the image-capturing path with at least one of the plurality of lens by the at least one image-capturing device.

13. The method according to claim 10 further comprising a labeling step: labeling an additional target or the obstacle in the image data to produce the image-capturing path.

14. The method according to claim 10, wherein the seeking device or the at least one image-capturing device is further provided with a VNIR-SWIR imaging sensor.

15. The method according to claim 10 further comprising an angle-determining step: determining the at least one angle at which the image data corresponding to at least one part of the image-capturing path is captured according to the orbit height of the satellite and the position of the target or the obstacle.

16. The method according to claim 10, wherein the processing device is a machine-learning based processing device.

17. The method according to claim 10, wherein the seeking device is provided a low resolution and wide angle lens; the at least one image-capturing device is provided a high resolution lens.

18. The method according to claim 10, wherein the obstacle is a cloud, and/or the target is transportation.

\* \* \* \* \*